United States Patent
Grimes et al.

(10) Patent No.: US 8,214,877 B1
(45) Date of Patent: Jul. 3, 2012

(54) SYSTEM AND METHOD FOR THE IMPLEMENTATION OF POLICIES

(75) Inventors: Mikal Grimes, Austin, TX (US); William Corbett, Austin, TX (US); Alex Devine, Austin, TX (US)

(73) Assignee: Troux Technologies, Austin, TX (US)

( * ) Notice: Subject to any disclaimer, the term of this patent is extended or adjusted under 35 U.S.C. 154(b) by 1090 days.

(21) Appl. No.: 11/805,002

(22) Filed: May 22, 2007

Related U.S. Application Data

(60) Provisional application No. 60/802,582, filed on May 22, 2006.

(51) Int. Cl.
*H04L 29/06* (2006.01)

(52) U.S. Cl. ............ 726/1; 726/3; 726/6; 726/7; 726/2; 726/21; 713/155; 713/166; 709/229; 709/218; 709/225; 707/705; 707/694

(58) Field of Classification Search ................. None
See application file for complete search history.

(56) References Cited

U.S. PATENT DOCUMENTS

| | | | |
|---|---|---|---|
| 5,572,732 A | 11/1996 | Fant et al. | |
| 5,845,068 A * | 12/1998 | Winiger | 726/3 |
| 5,968,176 A * | 10/1999 | Nessett et al. | 726/11 |
| 6,226,792 B1 | 5/2001 | Goiffon | |
| 6,292,900 B1 * | 9/2001 | Ngo et al. | 726/6 |
| 6,442,557 B1 | 8/2002 | Buteau et al. | |
| 6,509,898 B2 | 1/2003 | Chi et al. | |
| 6,529,909 B1 | 3/2003 | Bowman-Amuah | |
| 6,611,838 B1 | 8/2003 | Ignat et al. | |
| 6,662,188 B1 | 12/2003 | Rasmussen et al. | |
| 7,080,077 B2 * | 7/2006 | Ramamurthy et al. | 707/754 |
| 7,103,171 B1 | 9/2006 | Annadata et al. | |
| 7,124,180 B1 | 10/2006 | Ranous | |
| 7,231,661 B1 * | 6/2007 | Villavicencio et al. | 726/4 |
| 7,409,707 B2 * | 8/2008 | Swander et al. | 726/13 |
| 7,428,546 B2 | 9/2008 | Nori et al. | |
| 7,480,798 B2 * | 1/2009 | Haugh | 713/166 |
| 7,512,965 B1 * | 3/2009 | Amdur et al. | 726/1 |
| 7,523,128 B1 | 4/2009 | Miller et al. | |
| 7,533,173 B2 * | 5/2009 | Badovinatz et al. | 709/226 |
| 7,558,790 B1 | 7/2009 | Miller et al. | |
| 7,603,547 B2 * | 10/2009 | Patrick et al. | 713/152 |
| 7,644,432 B2 * | 1/2010 | Patrick et al. | 726/1 |
| 7,664,712 B1 | 2/2010 | Duvall et al. | |
| 7,669,051 B2 * | 2/2010 | Redlich et al. | 713/166 |
| 7,698,683 B1 | 4/2010 | Miller et al. | |

(Continued)

OTHER PUBLICATIONS

U.S. Patent and Trademark Office, Office Action issued in U.S. Appl. No. 11/117,039 mailed Feb. 12, 2009, Eric Maginniss, 27 pages.

(Continued)

*Primary Examiner* — Syed A. Zia

(74) *Attorney, Agent, or Firm* — Sprinkle IP Law Group

(57) ABSTRACT

Embodiments of the present invention provide systems and methods for developing policies which govern entities and applying the developed policies against representations of entities, where the representations are contained in a repository. One embodiment of a method of the present invention includes obtaining a policy comprising a rule, wherein the rule comprises a condition associated with compliance to the rule, generating one or more filters according to the condition, applying the one or more filters to a plurality of representations in a repository, wherein each representation represents an entity and determining a set of entities compliant with the rule based on the application of the one or more filters to the plurality of representations.

25 Claims, 6 Drawing Sheets

U.S. PATENT DOCUMENTS

| | | | |
|---|---|---|---|
| 7,757,277 B2 * | 7/2010 | Haugh | 726/7 |
| 7,822,710 B1 | 10/2010 | Miller et al. | |
| 789,054 A1 | 2/2011 | Cason, Jr. et al. | |
| 8,027,956 B1 | 9/2011 | Van Riper et al. | |
| 8,086,615 B2 * | 12/2011 | Patrick et al. | 707/754 |
| 2003/0009487 A1 * | 1/2003 | Prabakaran et al. | 707/204 |
| 2003/0088551 A1 | 5/2003 | Tong | |
| 2003/0110253 A1 | 6/2003 | Anuszczyk et al. | |
| 2003/0177481 A1 | 9/2003 | Amaru et al. | |
| 2003/0187826 A1 | 10/2003 | Kennedy et al. | |
| 2003/0208367 A1 | 11/2003 | Aizenbud-Reshef et al. | |
| 2003/0212640 A1 | 11/2003 | Andresen | |
| 2004/0002818 A1 | 1/2004 | Kulp | |
| 2004/0049509 A1 | 3/2004 | Keller | |
| 2004/0059943 A1 * | 3/2004 | Marquet et al. | 713/201 |
| 2004/0073655 A1 | 4/2004 | Kan | |
| 2004/0111513 A1 | 6/2004 | Shen | |
| 2004/0225791 A1 | 11/2004 | Keskar | |
| 2004/0243835 A1 * | 12/2004 | Terzis et al. | 713/200 |
| 2004/0260706 A1 | 12/2004 | Anonsen et al. | |
| 2005/0033762 A1 | 2/2005 | Kasravi | |
| 2005/0138039 A1 | 6/2005 | Hagen | |
| 2005/0203920 A1 | 9/2005 | Deng | |
| 2006/0085837 A1 * | 4/2006 | Pesati et al. | 726/1 |
| 2006/0106796 A1 | 5/2006 | Venkataraman et al. | |
| 2006/0136437 A1 | 6/2006 | Yamasaki | |
| 2006/0167927 A1 | 7/2006 | Edelstein | |
| 2006/0195460 A1 | 8/2006 | Nori | |
| 2006/0195575 A1 * | 8/2006 | Delany et al. | 709/225 |
| 2006/0212487 A1 * | 9/2006 | Kennis et al. | 707/200 |
| 2006/0253709 A1 * | 11/2006 | Cheng et al. | 713/182 |
| 2006/0277022 A1 | 12/2006 | Pulfer | |
| 2006/0294148 A1 | 12/2006 | Brunet | |
| 2007/0143604 A1 * | 6/2007 | Arroyo et al. | 713/167 |
| 2007/0180490 A1 * | 8/2007 | Renzi et al. | 726/1 |
| 2007/0192415 A1 | 8/2007 | Pak | |
| 2007/0255841 A1 * | 11/2007 | Chong | 709/229 |
| 2007/0282916 A1 | 12/2007 | Albahari et al. | |
| 2008/0120362 A1 | 5/2008 | Kapoor et al. | |
| 2010/0169380 A1 | 7/2010 | Miller et al. | |

OTHER PUBLICATIONS

U.S. Patent and Trademark Office, Office Action issued in U.S. Appl. No. 11/095,323 mailed Feb. 17, 2009, William C. Cason Jr., 14 pages.

U.S. Patent and Trademark Office, Office Action issued in U.S. Appl. No. 10/802,304, mailed Feb. 17, 2009, Clint Miller, 12 pages.

U.S. Patent and Trademark Office, Office Action issued in U.S. Appl. No. 11/198,649 mailed Feb. 27, 2009, Clayton Duvall, 11 pages.

Office Action mailed Mar. 1, 2010 in U.S. Appl. No. 11/095,323, 24 pages.

Office Action mailed Mar. 15, 2010 in U.S. Appl. No. 11/117,039, 31 pages.

Office Action mailed Mar. 16, 2010 in U.S. Appl. No. 11/805,873, 13 pages.

Office Action issued U.S. Appl. No. 11/929,157, mailed Jun. 6, 2010, 13 pgs.

Du et al., "XML structures for relational data," Web Info. Sys. Engineering, 2001. Proceedings of the Second Int'l Conf. on (0-7965-1393-X), Dec. 3-6, 2001, vol. 1; p. 151-160 download: http://ieeexplore.ieee.org/stamp/stamp.jsp?isnumber+21506&arnumber=996476&punumber=7824.

Gomik, "UML Data Modeling Profile", 2002, Rational corp., TP162, pp. i-ii, 1-11, May 2002.

CBOP et al., "A UML Profile for Enterprise Distributed Object Computing—Joint Final Submission—Component Collaboration Archicatures (CCA)", OMG Document No. ad/2001-08-19, http://enterprisecomponent.com/docs/EdocCCA.pdf, 169 pages, Feb. 2002.

Office Action mailed Aug. 4, 2009 in U.S. Appl. No. 10/802,304, 10 pages.

Office Action mailed Aug. 17, 2009 in U.S. Appl. No. 11/117,039, 27 pages.

Office Action mailed Aug. 28, 2009 in U.S. Appl. No. 11/095,323, 16 pages.

Office Action mailed Sep. 11, 2009 in U.S. Appl. No. 11/805,873, 10 pages.

Office Action issued in U.S. Appl. No. 10/803,133 dated Oct. 4, 2006.

Office Action issued in U.S. Appl. No. 10/803,133 dated May 17, 2007.

Office Action issued in U.S. Appl. No. 10/803,133 dated Nov. 2, 2007.

Office Action issued in U.S. Appl. No. 10/802,304 dated Jan. 9, 2008.

Office Action issued in U.S. Appl. No. 10/802,304 dated Jun. 30, 2008.

Office Action issued in U.S. Appl. No. 10/803,133 dated May 28, 2008.

Office Action issued in U.S. Appl. No. 10/802,178 dated Aug. 19, 2008.

Office Action issued in U.S. Appl. No. 11/095,323 dated Mar. 3, 2008.

Office Action issued in U.S. Appl. No. 11/095,323 dated Aug. 10, 2007.

Office Action issued in U.S. Appl. No. 11/095,323 dated Aug. 20, 2008.

Office Action issued in U.S. Appl. No. 11/095,323 issued Aug. 20, 2008.

Office Action issued in U.S. Appl. No. 11/117,039 issued Aug. 20, 2008.

Office Action issued in U.S. Appl. No. 10/802,178 issued Mar. 3, 2008.

Office Action issued in U.S. Appl. No. 10/802,178 issued Sep. 5, 2007.

Muller, Robert, "Database Design for Smarties Using UML for Data Modeling", Morgan Kaufmann Publishers, 265 pages, 1999.

Office Action issued in U.S. Appl. No. 10/802,304 mailed Jun. 18, 2007.

Office Action issued in U.S. Appl. No. 11/198,649 mailed Apr. 29, 2008.

Office Action issued in U.S. Appl. No. 10/803,133 mailed Oct. 7, 2008.

Notice of Allowance issued in U.S. Appl. No. 11/929,157, mailed May 23, 2011, 17 pages.

Office Action issued U.S. Appl. No. 11/929,157, mailed Nov. 24, 2010, 12 pages.

Notice of Allowance for U.S. Appl. No. 11/805,873, mailed Aug. 31, 2010, 6 pgs.

Notice of Allowance for U.S. Appl. No. 11/117,039, mailed Mar. 27, 2012, 15 pages.

* cited by examiner

```
Car Policy
General Information                                              Print
Description:
Status:        Active
Coordinator:  ⎤
Author:        ⎥
Contributors:  ⎬ 460
Approvers:    ⎦
Execution Schedule —450
Policy execution start data, executed every day.
Official runs will be saved for 1 year.
Test runs will be saved for 1 year.
Rules —410
Name:         Car Rule —440
Description:
Status:        Active
Component Type: car
Criteria for selecting assets under consideration:
 All components of type 'car'
Pass/fail criteria:
 car.has tire.tires.speed rating Equals 60
 ALL related instances must pass.
Remediations —420
 None defined on this policy.
Exceptions —430
 None defined on this policy.
Extra Information
┌──────────────────────┬──────────────────────┐
│ Property Name        │ Property Value       │
├──────────────────────┼──────────────────────┤
│ Notes                │                      │
└──────────────────────┴──────────────────────┘
```

*FIG. 4*

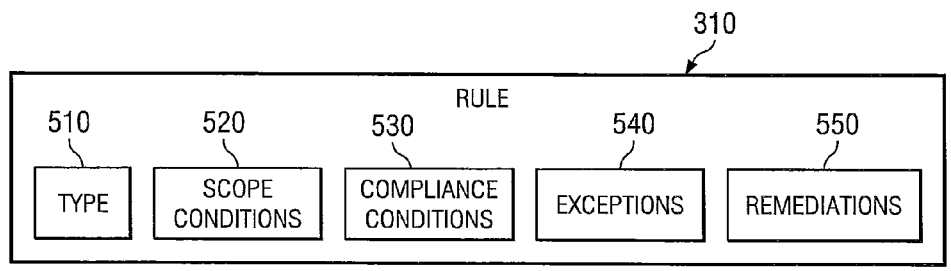

*FIG. 5*

Policy Editor Rule

Name: Server IT Owner Assessment Rule

Description: Servers that cost more than $5000 or have a BIA score must have IT Owner assigned to Bob Daniels or James Friend.

Component Type: TRM Server ▼ — 610

Scope Conditions — 620

| Property | Operator | Operand |
|---|---|---|
| TRM: Server.Cost | Greater Than or Equals | 5000 |
| TRM: Server.BIA Score | Greater Than or Equals | 750 |

Conditions 1 to 2 of 2 [Create] [Edit] [Delete]

○ And  ● Or
All related instances must pass. [?]       Advanced View

Compliance Conditions — 630

| Property | Operator | Operand |
|---|---|---|
| TRM: Server.IT Owner | Equals | Bob Daniels |
| TRM: Server.IT Owner | Equals | James Friend |

Conditions 1 to 2 of 2 [Create] [Edit] [Delete]

○ And  ● Or
All related instances must pass. [?]       Advanced View

Status: Editing Rule for Policy: Car Policy    [Save] [Cancel]

*FIG. 6*

SYSTEM AND METHOD FOR THE IMPLEMENTATION OF POLICIES

RELATED APPLICATIONS

This application claims priority under 35 U.S.C. §119 to U.S. Provisional Patent Application No. 60/802,582, entitled "System and Method for Definition and Execution of Business-level Policies on a Data Model" by Grimes, et al., filed on May 22, 2006. All applications cited within this paragraph are fully incorporated by reference.

TECHNICAL FIELD OF THE INVENTION

The present invention relates to systems and methods for the implementation of policies. More particularly, the present invention relates to systems and methods for developing policies which govern logical or physical entities and implementing the developed policies. Even more particularly, the present invention regards systems and methods for developing policies which govern entities and applying the developed policies against representations of entities, where the representations are contained in a repository.

BACKGROUND

An organization may contain a plurality of logical or physical entities. Examples of logical or physical entities include computers or computer systems or any other device. Policies may be used to order and regulate entities. An example of a policy might be a requirement that all computers have a back-up drive. Policies developed by different individuals often overlap and conflict and it may be uncertain as to which entities a policy applies. Confusion regarding policies may be further exacerbated by uncertainty as to who may develop or modify policies. Thus policies or parts of policies may be invalid, making the enforcement of policies confused and problematic. Further complicating policy enforcement, policies are often maintained at different locations which may make policies difficult to access for updating or verification.

Policies are often implemented through a combination of computer-based development and manual intervention. For example, an information technology (IT) administrator may receive or develop a set of policies regarding minimum computer specifications for computers. The administrator may then obtain a list of computers which do not comply (i.e. are non-compliant) with a policy from a database (or other data repository) by querying for non-compliant computers using sets of structured query language (SQL) statements or other database query language statements. These SQL statements may have to be written by the administrator: consequently, a large and complex set of query statements may have to be written. In the alternative, the administrator may physically compile a list of non-compliant computers. Either of the above methodologies of developing a list of non-compliant computers is time-consuming, cumbersome, complex or prone to error. The list may be used as a to-do list for the physical updating of the non-compliant computers. Because an individual updates entities according to a physical list, there may not be an adequate mechanism by which an administrator or manager can track the progress of updating non-compliant computers.

As is demonstrated by the above examples, policies may not be developed or implemented in a coordinated manner. Furthermore, because some implementations of the process may require querying a database, the above methods may require the use of specialized knowledge, increasing the complexity of the above process.

SUMMARY

Embodiments of the present invention provide a system and method for the development of policies which govern logical and physical entities and the implementation of these policies. More particularly, embodiments of the present invention comprise obtaining a policy having a rule, the rule containing a condition associated with compliance to the rule. One or more filters can be generated according to the condition and applied to a plurality of representations in a repository, where each representation represents an entity. A set of entities compliant with the rule can be determined based on the application of the one or more filters to the plurality of representations. Applying the one or more filters to a plurality of representations can comprise evaluating one or more associated representations. A policy can further include exceptions and remediations and may be developed in accordance with policy roles.

Embodiments of the invention can include computer programs containing computer instructions executable by a computer processor. The computer programs can be contained on computer readable medium or on multiple computer readable mediums. In one embodiment, a computer program can be run on multiple computer processors substantially simultaneously.

In embodiments of the invention, policies may be developed and implemented at a central location, allowing policies to be easily accessible for modification and review. In embodiments of the invention, policies can be developed and implemented in a coordinated process in accordance with policy roles such that policies are valid with regard to the entities they govern. Further embodiments of the invention may allow for the monitoring of non-compliant entities and may allow for the process of bringing non-compliant entities into compliance to be monitored. In embodiments of the invention, policies may be developed and implemented using a computer program which can include an interface such as a graphical user interface, making the development of policies easier and more intuitive. In some embodiments, the user interface can eliminate the need for users to write query statements, reducing the complexity of implementing policies.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein:

FIG. 4 is one example of a representation of one example of a policy;

FIG. 5 is a diagrammatic representation of one embodiment of a rule;

FIG. 6 is one example of a representation of one example of a rule;

DETAILED DESCRIPTION

Embodiments of the invention are illustrated in the FIGURES, like numerals being used to refer to like and corresponding parts of the various drawings.

Embodiments of the present invention provide a method and system for developing, managing or implementing policies. One embodiment of the invention can comprise a policy engine incorporated into or associated with a data repository. The policy engine can allow one or more users to develop policies. Policies govern entities. Policies can be developed in conjunction with the policy engine and one or more policies can be applied to representations of entities contained in a data repository to determine entities which comply or do not comply with one or more policies.

Figure 1:
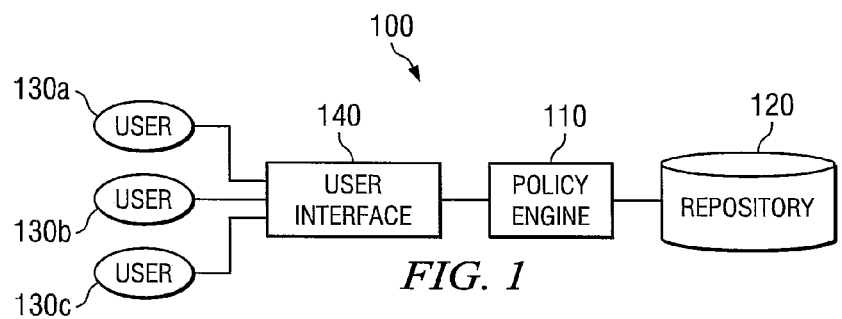
FIG. 1 is a diagrammatic representation of one embodiment of a system of the present invention.

Attention is directed to FIG. 1. FIG. 1 is a diagrammatic representation of one embodiment of a system implementing the present invention. In system 100 of FIG. 1, policy engine 110 is associated with repository 120 and user interface 140. Policy engine 110 is operable to access repository 120. Repository 120 can contain representations of logical or physical entities. Users 130*a*-130*c* interface with policy engine 110 via user interface 140. In one embodiment, user interface 140 is a graphical user interface (GUI).

More specifically, users 130*a*-130*c* can interface with policy engine 110 via user interface 140 to develop one or more policies to be used in conjunction with policy engine 110. Policy engine 110 can apply one or more policies against repository 120, where repository 120 contains representations of entities, such that the compliance of entities with one or more policies can be assessed.

In one embodiment, repository 120 may be a database which can allow for the representation of any logical or physical entity and the associations and dependencies between these entities. Components may be used to represent entities while relationships may be used to represent the associations and dependencies between the entities. Components or relationships can be referred to as data structures. Data structures may have a set of associated properties. The term property is intended to mean a characteristic associated with a component or a relationship. A property may have a name and a value associated with it, and components of the same data structure type may have different values for the same property. The term data structure type is intended to mean a category of a relationship or a component. All relationships or components of the same data structure type can have the same properties, though each instance of a component or a relationship may have different values for those properties. For example, a component type named "ComputerType" may be defined, having the properties of "RAM" and "OSType". Each instance of component type "ComputerType" will have the properties "RAM" and "OSType", however in one instance the value of "RAM" may be 4 megabytes, while in another instance the value of "RAM" may be 8 megabytes. A system of data structure types may be utilized with a generic data model to define a hierarchy of data structures. The data structures associated with a generic data model may be stored utilizing a table schema which does not change with the addition of new data structures or types of data structures. A database query language may be utilized with a generic data model to search the generic data model according to specific criteria. The above-described database is described in greater detail in U.S. patent application Ser. Nos. 10/802,304, entitled Method and System for a Generic Data Model and 10/803,133, entitled Method and System for Querying an Applied Data Model, both of which are hereby incorporated by reference. Systems and methods of augmenting and updating data in the Troux database are described in U.S. patent application Ser. No. 11/805,873, entitled "System and Method for Data Collection" by Miller et al., filed on May 24, 2007 issued as U.S. Pat. No. 7,822,710 on Oct. 26, 2010.

Figure 2:
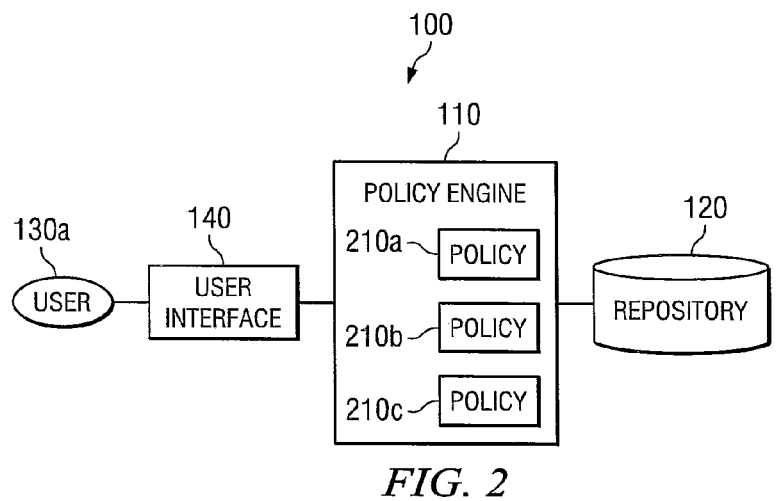
FIG. 2 is a diagrammatic representation of one embodiment of a system of the present invention.

As shown in system 100 of FIG. 2, policies 210*a*-210*c* are maintained in conjunction with policy engine 110 (e.g. stored in a storage medium accessible by policy engine 110). Policies 210*a*-210*c* can be developed by user 130*a* using user interface 140. Logical or physical entities can be represented as data structures in repository 120. Entities represented by data structures in repository 120 may or may not comply with policies 210*a*-210*c*. To assess the compliance of entities with policies 210*a*-210*c*, a policy run is launched. A policy run applies one or more policies 210*a*-210*c* to data structures in repository 120 which represent entities. Based upon the application of policies 210*a*-210*c* to the data structures in repository 120, the compliance of corresponding entities with policies 210*a*-210*c* can be assessed. Policy runs can be scheduled, automatic or user-initiated. Policies 210*a*-210*c* can be run against the whole of repository 120 or sections of repository 120.

In one embodiment, an entity can be characterized as compliant with one or more policies or non-compliant with one or more policies. Other characterizations are possible. For example, complying with one policy among a number of policies can indicate compliance with a set of policies or a specified number or percentage of entities complying with a policy can indicate compliance with a policy or set of policies.

Figure 3:
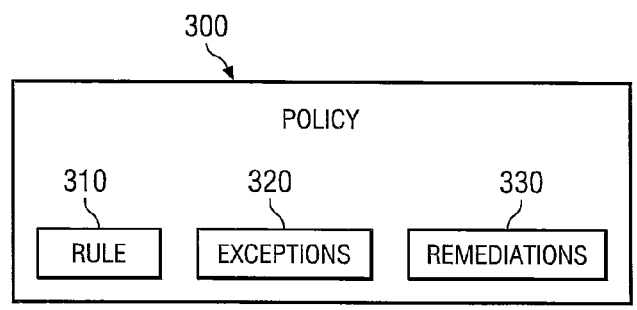
FIG. 3 is a diagrammatic representation of one embodiment of a policy.

FIG. 3 depicts one example of an embodiment of a block diagram representing a policy 300. Policy 300 comprises rule 310, exceptions 320 and remediations 330. In one embodiment, policy 300 contains one or more rules. Rule 310 specifies conditions with which entities should comply. In one embodiment, if an entity meets one or more conditions of rule 310, the entity is in compliance with rule 310 and may be in compliance with policy 300. Policy 300 further includes exceptions 320. Exceptions 320 may exempt one or more entities from compliance with policy 300. Policy 300 further includes remediations 330. Remediations 330 may exempt one or more entities from compliance with policy 300 for a time period.

Policy 300 and other policy embodiments can further include a set of policy roles for individuals involved with the policy. Policy roles may govern who may develop or modify policies. By delineating the role any one individual has in the development, maintenance and implementation of policies, policy roles help to ensure the development and maintenance of valid policies. For example, access to modify policies may be based on policy roles, helping to ensure that policies can only be modified by qualified individuals. The position of an individual may be used to determine what policy role that individual is given. Example policy roles can include: policy coordinator, policy author, policy contributor, policy approver and assigned remediation user. A policy coordinator can be responsible for the overall coordination of policies. A policy author can be responsible for the creation and maintenance of policies. A policy contributor can provide input to the policy creation process. A policy approver can be responsible for the review and approval of policies as they are completed. An assigned remediation user can be assigned remediation tasks to bring assets into compliance with policies.

FIG. 4 is one example of a representation of one example of a policy as represented by GUI 400. As can be seen, GUI 400 contains rules section 410, remediations section 420 and exceptions section 430. Rules section 410 contains rule 440. GUI 400 also contains execution schedule 450 which contains information regarding the application of the policy. GUI 400 also contains policy roles 460.

FIG. 5 is a block diagram depicting one embodiment of rule 310 of policy 300. Rule 310 contains one or more conditions of policy 300 and can be used to assess the compliance of one or more entities with policy 300. One or more conditions of rule 310 can be applied to a set of entities. If an entity meets one or more conditions of rule 310, the entity may be in compliance with rule 310. Rule 310 includes type 510, scope conditions 520, compliance conditions 530, exceptions 540 and remediations 550. Type 510 can specify entities to be governed by rule 310. In one embodiment, type 510 can specify entities to be governed by rule 310 based on the data structure type of the data structure representations of the entities. Scope condition(s) 520 can include one or more conditions which define a set of entities to be governed by the rule 310. Compliance condition(s) 530 can include one or more conditions for an entity to meet to be in compliance with rule 310. In an alternate embodiment, a rule can comprise scope conditions and compliance conditions such that the functionality of type is included in one or more scope conditions. Type 510, scope condition(s) 520 or compliance condition(s) 530 can be defined using Boolean logic. Types or conditions can be combined using Boolean logic. Exceptions 540 may exempt one or more entities from compliance with rule 310. Remediations 550 may exempt one or more entities from compliance with rule 310 for a time period.

FIG. 6 is one example of a representation of one example of a rule as represented by GUI 600. As can be seen, GUI 600 contains type selector 610, scope conditions section 620 and compliance conditions section 630. Scope conditions section 620 contains two conditions. Compliance conditions section 630 contains two conditions.

Turning back to FIG. 3, policy 300 can include one or more exceptions 320. An exception can be an exemption from compliance with a policy, e.g. policy 300. It may be possible that an individual knows of one or more entities which are non-compliant with a policy but there is a reason why the entities should not be grouped in the set of non-compliant entities. For example, a non-compliant server may be in the process of replacement with a compliant server. Accordingly, it may be confusing to include the soon to be replaced server in a set of non-compliant entities. An exception can be temporary or permanent. A temporary exception can exist for a specified period. Exceptions may regard specific entities or sets of entities. Exceptions may be implemented utilizing one or more conditions. In embodiments of the invention, conditions can be defined using Boolean logic. In some embodiments, an exception can be implemented as a list of entities which are to be excluded from a set of non-compliant entities. For example, in one embodiment, an exception can cover the non-compliance of a first listed entity with a first rule, the non-compliance of a second listed entity with a second rule and, based upon a condition, the non-compliance of a set of entities with a third rule. An exception can also be an exemption from compliance with a rule. Thus, a rule can, like a policy, include one or more exceptions.

Figure 7:
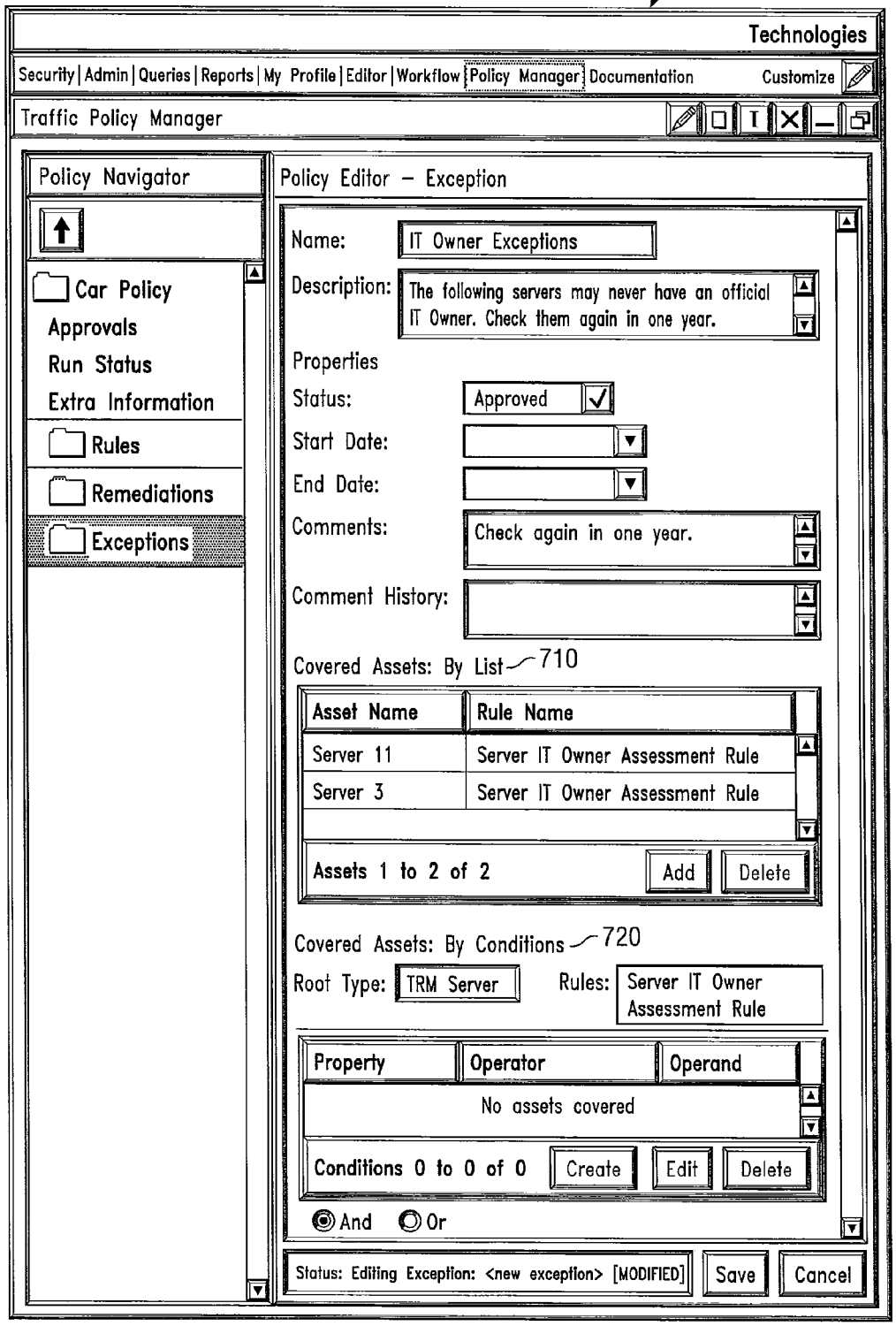
FIG. 7 is one example of a representation of one example of an exception.

FIG. 7 is one example of a representation of one example of an exception as represented by GUI 700. As can be seen, GUI 700 contains list section 710 to exempt individual assets (i.e. entities) by reference. GUI 700 further contains conditions section 720 to exempt assets by condition.

Turning back to FIG. 3, policy 300 can include one or more remediations 330. A remediation can be a time-limited exemption from compliance with a policy, e.g. policy 300. A remediation differs from an exception: an entity under remediation is expected to be brought into compliance within a time frame. Non-compliant entities can be marked for remediation and assigned to individuals charged with bringing the assigned entities into compliance. It may be possible that an individual knows of one or more entities which are non-compliant with the policy but there is a reason why the entities should not be grouped in the set of non-compliant entities. For example, a non-compliant group of servers may be in the process of being updated to be in compliance and it is the progress of the update process that must be monitored. Remediations may regard specific entities or sets of entities. Remediations may be implemented utilizing one or more conditions. In embodiments of the invention, conditions can be defined using Boolean logic. In some embodiments, a remediation can be implemented as a list of entities which are to be excluded from a set of non-compliant entities. A remediation can also be a time-limited exemption from compliance with a rule. Thus, a rule can, like a policy, include one or more remediations.

Figure 8:
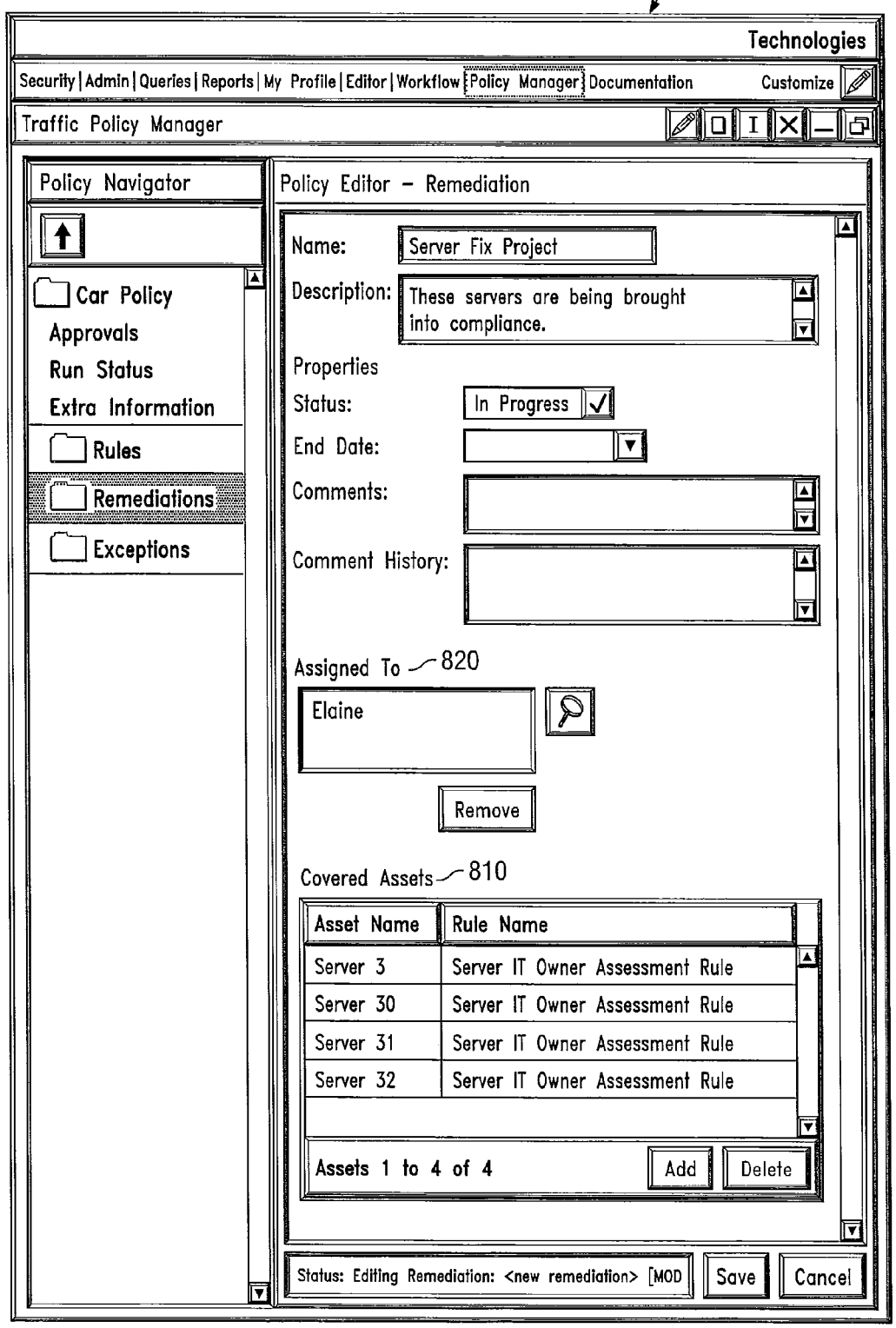
FIG. 8 is one example of a representation of one example of a remediation.

FIG. 8 is one example of a representation of one example of a remediation as represented by GUI 800. As can be seen, GUI 800 contains covered assets section 810 in which assets (i.e. entities) under remediation for non-compliance with specific rules are recorded. GUI 800 further contains assigned to section 820 in which the individuals charged with bringing the listed assets into compliance are recorded.

Embodiments of remediations can allow the process of bringing entities into compliance with a policy to be monitored. For example, a set of non-compliant entities can be placed in remediation, and assigned to one or more individuals charged with bringing the entities into compliance. Remediations can be associated with a clock or other timer such that users can be notified of which entities have been made compliant and which entities remain non-compliant at specified periods. In further embodiments, users can be informed of the status of entities in remediation as part of a policy run. Thus, the process of bringing entities into compliance with one or more policies can be monitored. Furthermore, in some embodiments, because the implementation of the process of making non-compliant entities compliant is assigned to one or more designated individuals, the effectiveness of the individuals charged with bringing entities into compliance can also be monitored.

Entities which fall under one or more exceptions or remediations can be determined. Such a determination can be part of a policy run. Information associated with entities falling under one or more exceptions or remediations can be compiled. For example, a list might be compiled which lists entities falling under an exception and failing a particular rule or policy. As would be understood by one of ordinary skill in the art, other information may be compiled.

In an embodiment of the invention, a policy can be implemented as one or more filters which are applied to data structures in a repository. One or more filters can be utilized to implement rules, exceptions or remediations. A filter can be utilized to determine a set of data structures which meet or do not meet one or more conditions. In one embodiment of a filter, data structures in a repository are evaluated to determine whether a data structure meets one or more conditions. A series of data structures may be linked by relationships. Such a series of data structures linked by relationships can be referred to as a path. Any one path can be of arbitrary length and include an arbitrary number of data structures and relationships. A data structure may be associated with multiple paths. The determination of whether a data structure meets a condition may depend on data structures or properties of data structures in a path associated with the data structure meeting the condition. Data structures in a path may be recursively evaluated and paths containing one or more data structures which meet the condition are recorded. If a path associated with the data structure is a recorded path, the data structure is in compliance with the condition. Through the above methodology, sets of data structures which meet or do not meet the one or more conditions can be compiled.

It is useful to illustrate one example of a filter: an example filter is a filter which filters data structures in a repository according to a condition to find servers which do not have user support in one or more associated maintenance agreements. Each server can be a represented by a server component. Likewise, each maintenance agreement can be represented by a maintenance agreement component. Maintenance agreement components may have a property indicating the existence of user support. Each server component may be linked by relationships to one or more maintenance agreement components. Each server-relationship-maintenance agreement path can be evaluated by one or more database query language statements. Each path having a maintenance agreement component with user support can be recorded. If all paths associated with a server component are evaluated and are not recorded, the server corresponding to the server component does not have user support in one or more associated maintenance agreements and can be included in the set of servers which do not have user support in one or more associated maintenance agreements. Thus, the set of servers which do not have user support can be compiled. After reading the above description of filters, it will be noted that filters can have multiple uses and can be implemented in multiple ways. For example, paths that did not have a maintenance agreement component with user support could be recorded and used to determine the set of servers which do not have user support.

Figure 9:
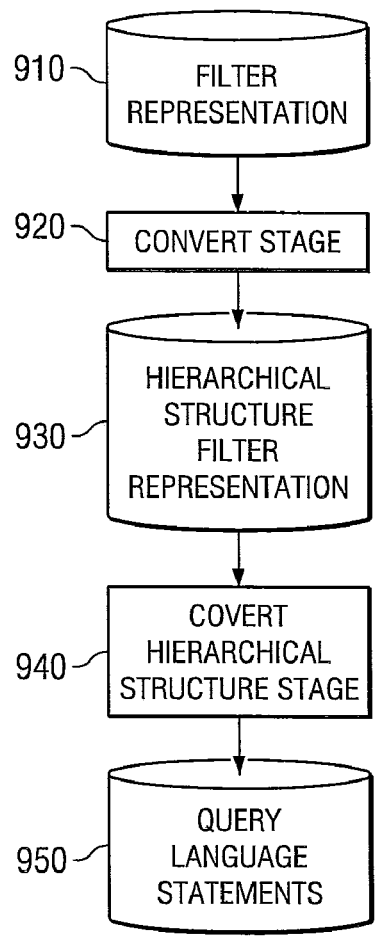
FIG. 9 is a diagrammatic representation of one embodiment of an implementation of a filter.

FIG. 9 is a diagrammatic representation of one embodiment of an implementation of a filter. Filter representation 910 might be a graphical representation produced using a user interface which might be a graphical user interface. Filter representation 910 can represent one or more conditions. The conditions may be expressed using Boolean logic. At convert stage 920, a policy engine converts filter representation 910 into hierarchical structure filter representation 930. Hierarchical structure filter representation 930 can represent the conditions of filter representation 910 as one or more hierarchical structures. In one embodiment of the invention, hierarchical structures can be XML, HTML or C structures. At convert hierarchical structure stage 940, the policy engine converts hierarchical structure filter representation 930 into query language statements 950. Query language statements 950 can be used to implement the conditions of the filter by querying a repository containing data structures representing entities to develop a set of entities which meet or do not meet the conditions represented by filter representation 910.

Figure 10:
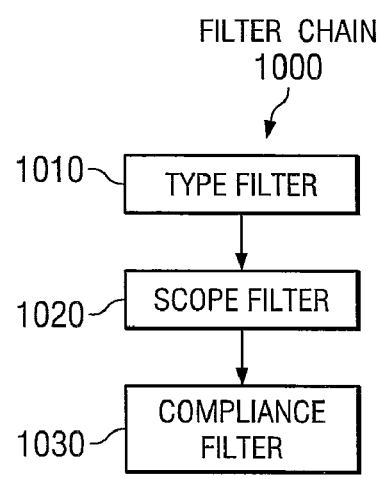
FIG. 10 is a diagrammatic representation of one embodiment of a filter chain.

In one embodiment, a policy can be implemented using one or more filters. The one or more filters can be used to assess the compliance of entities with the policy. One or more filters can be utilized in the implementation of rules, exceptions or remediations. Filters can be organized into one or more filter chains. A filter chain may be a serial application of filters to data structures. For example, in one embodiment of a rule, type, scope condition(s) and compliance condition(s) can each be implemented as a filter. As shown in FIG. 10, such a rule can be implemented as filter chain 1000. In filter chain 1000, filters are applied to data structures in serial order. Type filter 1010 corresponds to type and filters data structures representing entities to determine which entities are governed by the rule. Data structures representing entities which are governed by the rule are passed on to be filtered by scope filter 1020. Scope filter 1020 filters in accordance with the scope conditions of the rule. Data structures which meet the scope conditions are passed on to be filtered by compliance filter 1030. Compliance filter 1030 filters in accordance with the compliance conditions of the rule. In one embodiment, the set of data structures which do not meet the compliance conditions represent entities which are not in compliance with the rule.

In one embodiment of a rule, a rule comprises scope conditions and compliance conditions such that the functionality of type is included in one or more scope conditions. In one embodiment of an implementation of such a rule, the functionality of the filters corresponding to type would be subsumed into the conditions of the filters implementing the scope conditions.

Embodiments of exceptions can be implemented utilizing one or more filters. For example, an exception may include a list of entities and one or more conditions for exemption from a rule or policy. In one embodiment of the invention, the conditions for exemption may be implemented as one or more filters. Filters implementing an exception may be part of a filter chain. It may also be possible to implement an exception as part of a filter or filters.

Likewise, embodiments of remediations can be implemented utilizing one or more filters. For example, a remediation may include a list of entities and one or more conditions for exemption from a rule or policy. In one embodiment of the invention, the conditions for exemption may be implemented as one or more filters. Filters implementing a remediation may be part of a filter chain. It may also be possible to implement a remediation as part of a filter or filters.

The filters and methods of implementing filters described above are by way of example only. Other filters and methods of implementing filters as would be known to those skilled in the art are also within the scope of the invention.

While embodiments of the present invention have been described in regard to a particular database, other databases may be used to implement the invention. Description with regard to the database of repository 120 is provided by way of example, not limitation.

Embodiments of the invention can be implemented as one or more computer programs or can be embodied in computer instructions. For example, the invention could be implemented as a stand alone program, importable engine or as a component or pluggable element of a larger program; such a larger program could be, for example, a database program. Embodiments of such computer programs can be run on more than one computers or processors substantially simultaneously.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A computer-implemented method for assessing the compliance associated with policies, comprising:

storing, in a database in a computer memory, a plurality of data structures, wherein each data structure includes a property name and associated value, a component data structure represents a physical or logical entity and a relationship data structure represents an association between two entities;

obtaining, by a policy engine associated with the database and a user interface, a policy comprising a rule, wherein the rule comprises a first condition associated with compliance to the rule;

generating, by the policy engine, one or more filters according to the first condition, wherein each filter comprises a database query statement associated with the first condition and a selected property name and associated value;

in response to an instruction to launch a policy run, selecting a set of data structures from the plurality of data structures;

applying, by the policy engine, the one or more filters to the selected set of data structures in the database such that each data structure in the selected set of structures is evaluated to determine if the value associated with the selected property name meets the first condition;

determining, by the policy engine, a first set of entities that are compliant with the rule based on the application of the one or more filters to the selected set of data structures;

determining a second set of entities that are not compliant with the rule based on the application of the one or more filters to the selected set of data structures; and outputting the first set of entities and the second set of entities to the user interface.

2. The method of claim 1, wherein the instruction to launch the policy run is scheduled.

3. The method of claim 1, wherein the instruction to launch the policy run is user-initiated.

4. The method of claim 1, wherein implementing the rule as one or more filters comprises:

converting a representation of the first condition into one or more hierarchical structures; and converting the one or more hierarchical structures into a set of query statements.

5. The method of claim 1, further comprising determining a third set of entities that are exempt from the rule.

6. The method of claim 5, further comprising determining a fourth set of entities that are in remediation from the rule.

7. The method of claim 6, further comprising for each entity in the fourth set of entities:

identifying a person responsible for bringing that entity into compliance; and assigning that entity to the person.

8. The method of claim 1, wherein the first condition is a compliance condition.

9. The method of claim 8, wherein the rule further comprises a second condition, wherein the second condition is a scope condition.

10. A system for assessing the compliance associated with policies, comprising:

a computer processor;

a non-transitory computer-readable medium coupled with the processor comprising:

a repository containing:

a plurality of data structures, wherein each data structure includes a property name and associated value, wherein each component data structure represents a physical or logical entity, wherein a relationship data structure represents an association between two entities; and a policy comprising a rule containing a first condition associated with compliance to the rule, the condition implemented as one or more filters stored in the repository, a set of instructions executable by the processor; and a policy engine associated with the repository; wherein the set of instructions include an instruction to launch a policy run, wherein the policy engine is configured to apply the one or more filters to a selected set of data structures in the repository in response to the instruction to launch a policy run such that each data structure in the selected set of data structures is evaluated to determine if the value associated with the selected property name meets the first condition, wherein each filter comprises a database query statement associated with a first condition and a selected property name and associated value, the policy engine configured to determine a first set of entities that are compliant with the rule based on the application of the one or more filters to the selected set of data structures and a second set of entities that are not compliant with the rule based on the application of the one or more filters to the selected set of data structures; and a user interface associated with the policy engine and configured to present the first set of entities and the second set of entities that are not compliant with the rule.

11. The system of claim 10, wherein the instruction to launch the policy run is scheduled.

12. The system of claim 10, wherein the instruction to launch the policy run is user-initiated.

13. The system of claim 10, wherein the policy engine is further configured to determine a third set of entities that are exempt from the rule.

14. The system of claim 13, wherein the policy engine is further configured to determine a fourth set of entities that are in remediation.

15. The system of claim 10, wherein the condition is a compliance condition.

16. The system of claim 15, wherein the rule further comprises a scope condition.

17. A non-transitory computer readable storage medium embodying computer executable instructions implementing a method for assessing the compliance associated with policies, comprising:

obtaining a policy comprising a rule, wherein the rule comprises a first condition associated with compliance to the rule;

generating one or more filters according to the first condition, wherein each filter comprises a database query statement associated with a first condition and a selected property name and associated value;

in response to an instruction to launch a policy run, selecting a set of data structures from a plurality of data structures;

applying the one or more filters to the selected set of data structures in the database such that each data structure in the selected set of data structures is evaluated to determine if the value associated with the selected property name meets the first condition;

determining a first set of entities that are compliant with the rule based on the application of the one or more filters to the selected set of data structures;

determining a second set of entities that are not compliant with the rule based on the application of the one or more filters to the selected set of data structures; and outputting the first set of entities and the second set of entities to the user interface.

18. The non-transitory computer readable storage medium of claim 17, wherein, the instruction to launch the policy run is scheduled.

19. The non-transitory computer readable storage medium of claim 17, wherein the instruction to launch the policy run is user-initiated.

20. The non-transitory computer readable storage medium of claim 17, wherein implementing the rule as one or more filters comprises:

converting a representation of the first condition into one or more hierarchical structures and converting the one or more hierarchical structures into a set of query statements.

21. The non-transitory computer readable storage medium of claim 17, wherein the instructions are further configured to determine a third set of entities that are exempt from the rule.

22. The non-transitory computer readable storage medium of claim 21, wherein the instructions are further configured to determine a fourth set of entities that are in remediation.

23. The non-transitory computer readable storage medium of claim 17, the method further comprising modifying the policy according to one or more policy roles.

24. The non-transitory computer readable storage medium of claim 17, wherein the first condition is a compliance condition.

25. The non-transitory computer readable storage medium of claim 24, wherein the rule further comprises a second condition, wherein the second condition is a scope condition.

* * * * *